United States Patent [19]

Seelig et al.

[11] 3,923,466
[45] Dec. 2, 1975

[54] APPARATUS FOR THE PRODUCTION OF CRACKED GAS

[75] Inventors: Henri F. Seelig, Essen; Herbert von Waclawiczek, Duisburg, both of Germany

[73] Assignee: Fried. Krupp Gesellschaft mit beschrankter Haftung, Essen, Germany

[22] Filed: Dec. 18, 1972

[21] Appl. No.: 316,426

[30] Foreign Application Priority Data
Dec. 16, 1971  Germany............................ 2162390

[52] U.S. Cl. ...................... 23/284; 23/260; 23/285; 23/288 K; 23/288 M; 48/105; 165/139; 165/158; 252/373; 176/39
[51] Int. Cl.² ...... B01J 1/00; B01J 8/06; C07C 1/02
[58] Field of Search. 23/284, 288 M, 288 H, 288 K, 23/283, 285; 252/373; 48/196 R, 73, 99, 105, 214, 202, 200; 165/139, 158; 176/39

[56] References Cited
UNITED STATES PATENTS

| | | | |
|---|---|---|---|
| 267,797 | 11/1882 | Miles .................................. | 165/158 |
| 1,949,563 | 3/1934 | Duke .................................. | 48/200 |
| 2,525,276 | 10/1950 | Shapleigh ....................... | 23/284 UX |
| 2,579,397 | 12/1951 | Roetheli ............................. | 48/202 |
| 2,625,470 | 1/1953 | Roberts, Jr. ....................... | 48/196 R |
| 2,904,417 | 9/1959 | Nuyl ................................. | 252/373 X |
| 2,937,077 | 5/1960 | Faatz, Jr. et al. .............. | 48/196 R X |
| 3,000,364 | 9/1961 | Steever ............................... | 23/284 X |
| 3,124,435 | 3/1964 | Byrne et al. ....................... | 48/105 |
| 3,154,385 | 10/1964 | Jacobs et al. ..................... | 23/284 |
| 3,160,498 | 12/1964 | Olt et al. ........................... | 23/284 X |
| 3,262,758 | 7/1966 | James et al. ..................... | 252/373 X |
| 3,452,721 | 7/1969 | Mariette et al. ................. | 165/158 X |
| 3,690,550 | 9/1972 | Hilberath et al. ................. | 176/39 X |
| 3,826,623 | 7/1974 | Delgado ............................. | 23/281 |

*Primary Examiner*—Morris O. Wolk
*Assistant Examiner*—Arnold Turk
*Attorney, Agent, or Firm*—Spencer & Kaye

[57] ABSTRACT

Cracked gas is produced by atomizing reaction materials consisting of carbon and/or hydrocarbon compounds with the assistance of superheated steam to form a mixture of superheated steam with finely dispersed particles of reaction materials. This mixture is fed into a reaction chamber where the superheated steam and the reaction material substantially react to form cracked gas. The produced cracked gas along with any remaining unreacted portion of the mixture is removed from the reaction chamber and passed through a heat exchanger in which the remaining mixture reacts so as to complete the production of the cracked gas.

8 Claims, 4 Drawing Figures

APPARATUS FOR THE PRODUCTION OF CRACKED GAS

BACKGROUND OF THE INVENTION

The present invention pertains to a method and corresponding apparatus for producing cracked gas from a mixture containing steam and reaction materials consisting of carbon and/or hydrocarbon compounds. Once the cracked gas has been obtained, it can be utilized in a process for the direct reduction of oxidic metal ores. This reaction occurs within a reaction vessel which is heated by utilizing a nuclear reactor coolant.

In the known conversion processes of this type the heat required for the cracking process is generally produced by combustion of a heat carrier within the interior of the reaction chamber. The heat carrier utilized is generally part of the hydrocarbon which is to be converted. Such a production of heat is expensive and uneconomical because a relatively large quantity of valuable raw material is burned. In addition, the resulting cracked gas contains impurities received from the combustion products. If, as it is often the case, the heat carrier is only incompletely burned, a further ancillary phenomenon which occurs is the formation of soot due to coking, which also results in heavy soiling of the installation and thus hampering of the process. In order to remove the impurities from the resulting cracked gas, it becomes necessary to add a complicated and expensive cleansing method. A method is known for delivering heat to the gas production process by indirect transfer of the heat through suitable walls from a nuclear reactor coolant. Details of how this is accomplished, however, are not disclosed.

SUMMARY OF THE INVENTION

It is an object of the present invention to provide a method and apparatus for the economical production of large quantities of cracked gases which are particularly useful for the direct reduction of oxidic metal ores without the necessity of prior intermediate treatment.

This and other objects are accomplished in accordance with the present invention by atomizing the reaction materials with the aid of superheated steam, produced by the heat of a nuclear reactor and forming a mixture of superheated steam with finely dispersed reaction particles. The mixture is then directed into the reaction chamber wherein the materials substantially react so as to produce the cracked gas which then flows out of the reaction chamber and through a heat exchanger.

The method for producing cracked gas in accordance with the present invention is extremely economical since the entire amount of energy required by the system, i.e. the heat energy required for the cracking process, the subsequently performed further heating of the cracked gases to the desired temperature required for the immediately following utilization for the gases, and the heat required for the production and superheating of the steam which is employed in the process, is furnished by the exhaust heat of a nuclear reactor. This exhaust heat also is almost completely consumed by the system, thus providing for maximum utilization of the supplied energy.

Cracked gas can be obtained with the assistance of steam from hydrocarbon compounds containing reaction materials, in accordance with the following equation:

$$C_nH_m + nH_2O + W = nCO + \frac{(2n+m)}{2}H_2$$

In this equation the term W means the heat necessary for the conversion of the hydrocarbon compounds into cracked gas. This reaction occurs almost to completion even at pressures of about 40 atmospheres and temperatures of about 850°C. The completion of the reaction is assured according to the present invention in that the cracked gas upon leaving the reaction chamber along with any remaining unreacted portion of the mixture flows through the heat exchanger where the remainder of the reaction of the thus far unreacted material takes place due to the additional heat provided and the extended period of dwell in the heated zone.

The apparatus provided in accordance with the present invention for performing this method includes a reaction vessel containing a tubular reaction chamber, which has a nozzle at its input end, and a heat exchanger surrounding the reaction chamber. It is particularly advantageous in this type of embodiment for the superheater for the steam to be disposed between the walls of the vessel and the heat exchanger and for the nozzle to be an annular Venturi nozzle. Consequently such apparatus permits dependable operation for the production of cracked gas to be achieved with little expense.

The apparatus according to the present invention is simple in construction and suitable for conducting heat because of its compact structure.

The reaction materials containing carbon and/or hydrocarbon may be any of the solid, liquid or gaseous fuels, either alone or in various combinations with each other. This makes it possible to select the most inexpensive reaction materials depending on the local conditions. Oil, oil products, and/or natural gas may be used, depending on availability and costs. A particular advantage of the present invention is that even coal dust can be used.

The nuclear reactor coolant will primarily be helium under the usual pressure of about 40 atmospheres, but organic substances, e.g. based on stearine, can also be used. The process heat may be conducted, if necessary for contamination reasons, through an intermediately connected secondary circuit.

The direct reduction which can take place after the completion of a process according to the present invention will be primarily for the extraction of iron ores, particularly those poorer than hematite ore, but also could be for other oxidic metal ores, for example oxidic copper ores.

DESCRIPTION OF THE PREFERRED EMBODIMENTS

Figure 1:
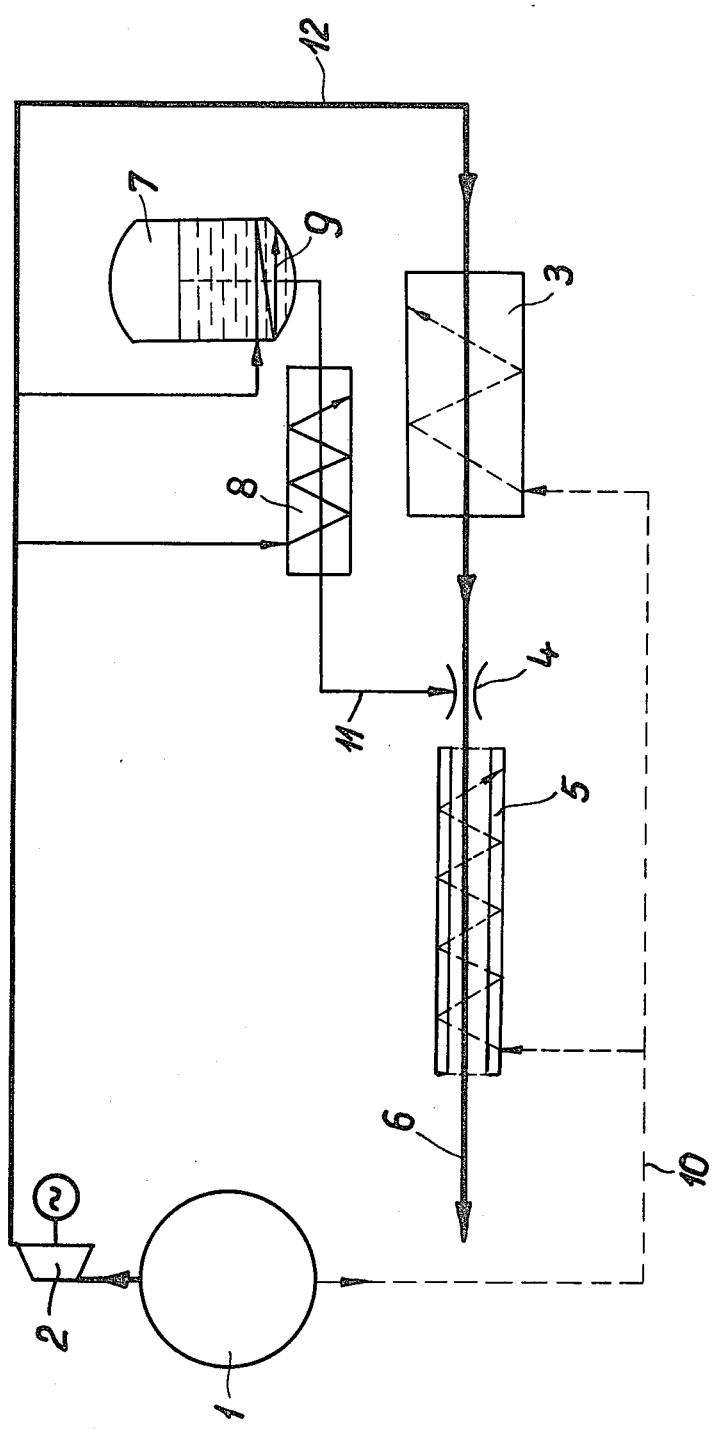
FIG. 1 is a simplified block diagram of a system, and associated flow paths for the heat and materials, for production of cracked gases in accordance with the present invention.

In the system shown in FIG. 1, a nuclear reactor 1, which is cooled with pressurized helium, provides steam which is initially used in a turbine 2 in order to produce electrical energy. The steam discharged from turbine 2 is fed along line 12 through a steam superheater 3, and then reaches nozzle 4 where it is mixed with reaction materials supplied from a reservoir 7. The mixture passes into a reaction chamber, disposed in a reaction vessel 5, where substantially all of the mixture reacts so as to produce cracked gas. The cracked gas and any remaining unreacted mixture then passes out of the reaction chamber and through a heat exchanger, also disposed in the reaction vessel, where the remainder of the mixture reacts so as to complete the production of the cracked gas. The resulting hot cracked gas then leaves the heat exchanger through a line 6 which is connected to a reduction furnace (not shown) or some other receiver.

Figure 2:
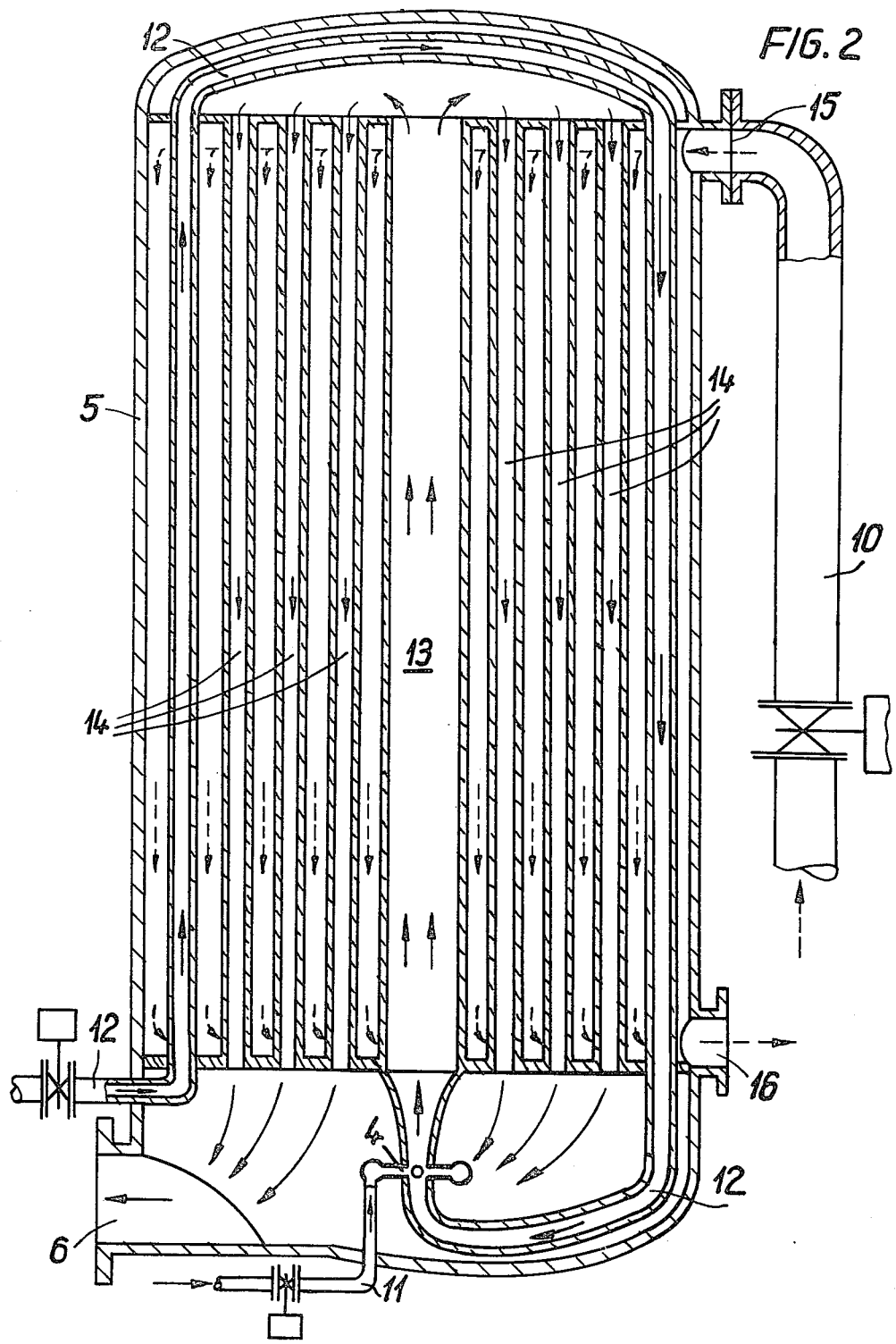
FIG. 2 is a longitudinal cross-sectional view of one embodiment of apparatus for performing the method according to the invention in the system of FIG. 1.

The oil, which is used as the reaction material in the embodiment shown in FIGS. 1 and 2, is conducted from a reservoir 7 by line 11 through a preheating heat exchanger 8 and into nozzle 4. A heating coil 9 serves to preheat the oil when the external temperature is low. The nuclear reactor coolant is fed through line 10 to the reaction vessel 5 and the superheater 3 for supplying heat to both of these elements.

FIG. 2 shows the structure of the reaction vessel 5 which is vertically oriented. The oil flowing into the vessel 5 through line 11 is carried through an annular Venturi nozzle 4, which is disposed in the lower portion of the vessel, by the steam fed in through line 12. The reaction material passing through the nozzle is thereby atomized with the assistance of the steam and thus forms a mixture of superheated steam with finely dispersed particles of reaction material. The thus resulting mixture, or aerosol, passes into a tubular reaction chamber 13 where the process of cracking the hydrocarbon molecules substantially takes place. The chamber 13 is centrally located within the vessel 5 along the longitudinal axis of the vessel 5. Any residual cracking process, which may possibly be necessary, takes place in the subsequently connected tubes 14 of a heat exchanger, accommodated in the same vessel. The heated cracked gas leaves vessel 5 through outlet line 6. The nuclear reactor coolant enters vessel 5 through line 10 at point 15 and travels through the vessel around the reaction chamber for supplying heat to the vessel and thus also to the chamber. The coolant leaves the vessel, flowing from the top of the vessel to the bottom and out through discharge pipe 16. The steam line 12 is disposed in the area between the insulated outer wall of the vessel 5 and the outer tubes 14 of the heat exchanger for superheating the steam in vessel 5.

Figure 3:
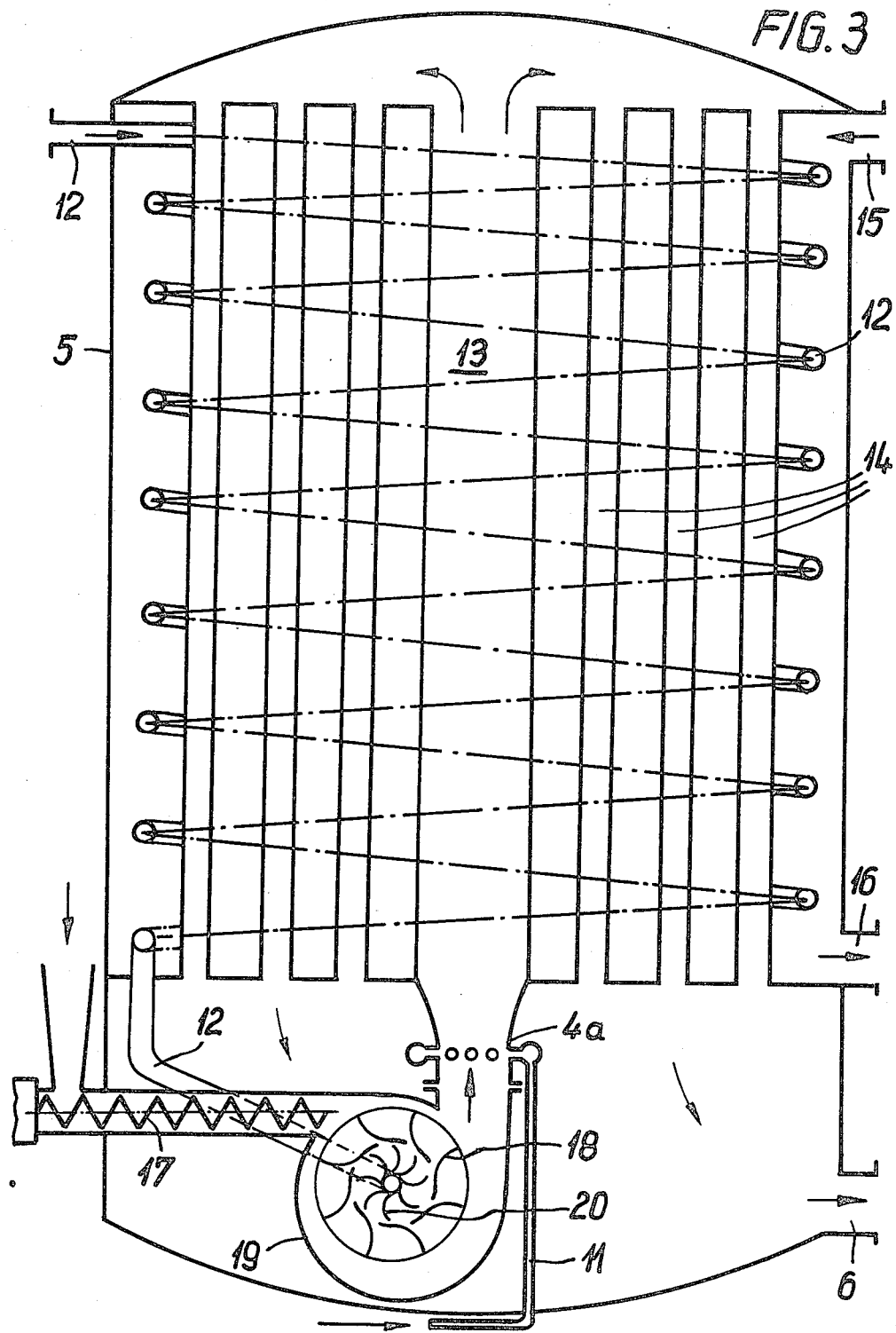
FIG. 3 is a view similar to that of FIG. 2 of another embodiment of apparatus for performing the method according to the present invention.

FIG. 3 shows another embodiment of the apparatus according to the present invention for permitting the use of coal dust as the reaction material. Coal dust introduced into the vessel through a worm 17 is conveyed to the vane wheel 18 of a spreader atomizer 19. From there the coal dust is mixed with the steam, which enters through line 12 and drives the spreader atomizer 19 via a further internal vane wheel 20 whereupon it leaves the spreader atomizer 19 through nozzle 4a, and the resulting mixture is introduced into the tubular reaction chamber 13. The spreader atomizer 19 is driven in a manner similar to that of a steam turbine. For this purpose a branched-off partial stream (not shown) of the steam is generally sufficient. The design of the nozzle 4a as an annular Venturi nozzle is intended for the situation where other reaction materials, for example oil or natural gas, are to be used together with the coal dust.

It is advantageous for the nuclear reactor coolant to enter the vessel somewhere around the center of the vessel between the upper and the lower ends of the vessel 5 where the discharge openings are disposed. Such a design provides for the hottest zone in the vessel being brought closer to the nozzle, which is the point where the mixture is formed. Also only the upper portion of the tubular reaction chamber 13 will thus be traversed by the coolant in a direct stream, while the upper portion of tubes 14, however, in a counter-current stream. Further advantageous modifications of the guidance system for the nuclear reactor coolant, for example, the installation of baffle plates, are of course possible.

Depending on the type of reaction material employed, a conventional catalyst can be installed in a known manner in the reaction chamber 13 as well as possibly also in pipes 14 of the heat exchanger in order to accelerate the reaction. A high activity nickel catalyst is to be employed to achieve good approaches to equilibrium. Proprietary catalysts such as ICI 46-1 or ICI 53-3 or Katalco 22 - 6 or at least five Girdler catalysts are suitable. Of course a catalyst mass can also be mixed with the materials for the reaction in a finely dispersed state. In this case a solution of nickel or a mixed alkaline nickel solution is acceptable. Economical working in this way will provide for a recovery of the catalysts.

The apparatus for performing the method of the present invention, or vessel 5, is particularly suited, due to its compact construction, for installation in the prestressed concrete vessel of a nuclear reactor.

The process itself is well known to everyone skilled in the art. Reference is made generally to the compendium of Bruno Riediger "Die Verarbeitung des Erdoles" Springer-Verlag Berlin - Heidelberg - New York, 1971, pp. 884–934 in particular pp. 909–921.

Figure 4:
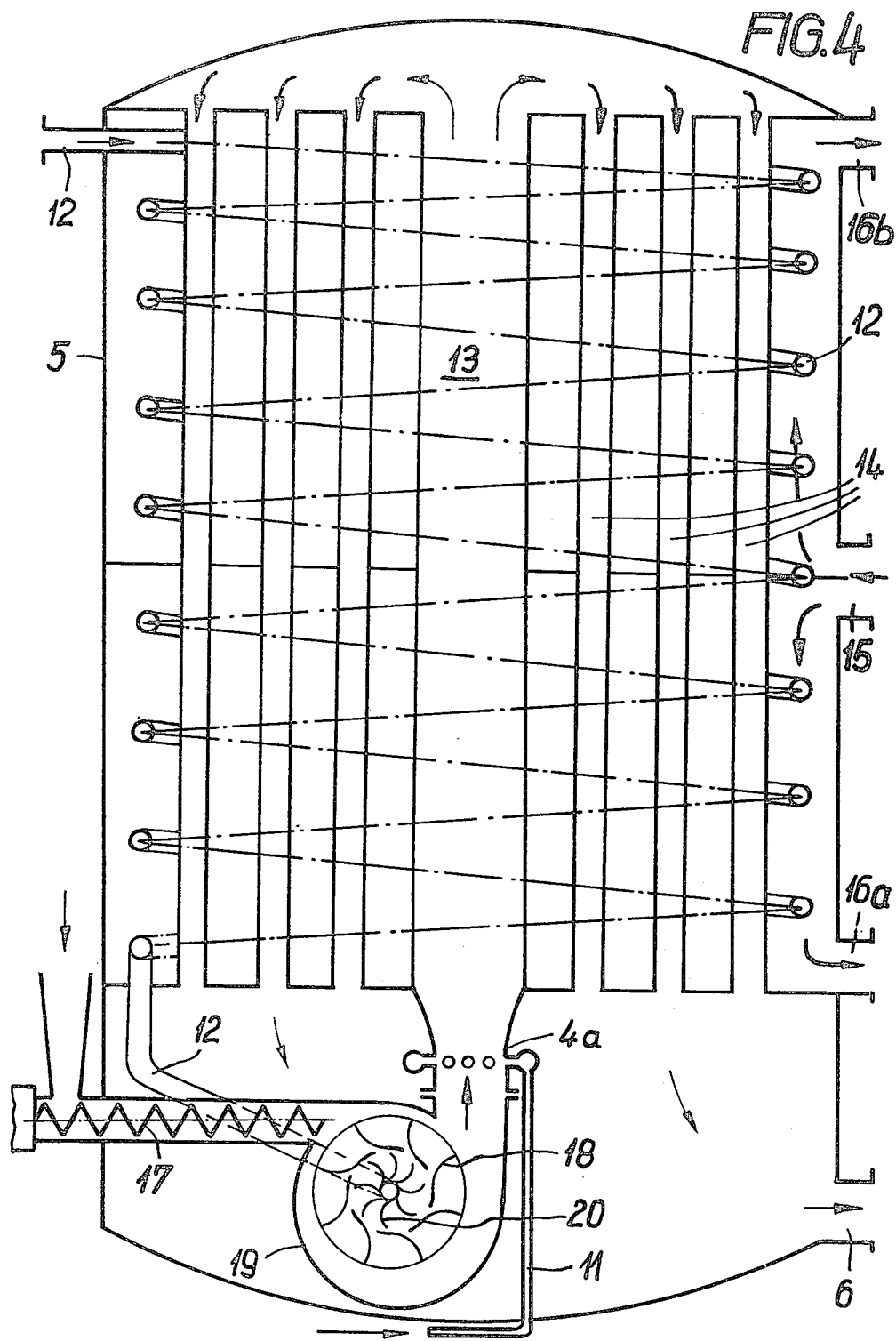
FIG. 4 is a view similar to that of FIG. 3 of another embodiment of apparatus for performing the method according to the present invention which combines direct and counter-current stream of the coolant.

FIG. 4 shows a modification of the device according to the invention represented by FIG. 3 or 2. In this embodiment, the nuclear reactor coolant enters the vessel 5 approximately midway between the upper end and the lower end of the vertically arranged vessel 5 at point 15. The stream of the hot medium divides fairly uniformly into an upward and a downward stream. After giving up its heat to the reactants in the reaction chamber 13 and in the pipes 14, the lower stream leaves the vessel 5 through discharge pipe 16a while the upper stream leaves through discharge pipe 16b. In this way, the hot zone where reactivity is high is brought closer to the point of mixture formation. Moreover, the two reaction chambers 13 and 14 are subjected to a uniflow heat exchange, as well as to a thermally more effective counter-flow heat exchange. This arrangement, therefore, results in more complete and more rapid reactions. The remaining details of the design according to FIG. 4 are the same as for the device represented by FIG. 3.

Of course it is possible to reverse the coolant streams, so that pipes 16a and 16b become intake pipes and pipe 15 becomes discharge pipe.

It will be understood that the above description of the present invention is susceptible to various modifications, changes and adaptations, and the same are intended to be comprehended within the meaning and range of equivalents of the appended claims.

We claim:

1. Apparatus for producing cracked gas from a mixture of steam and reaction materials selected from among organic carbon and hydrocarbon compounds, comprising, in combination: a feed line for supplying steam from a nuclear reactor, heating means connected to said feed line for heating said steam to produce superheated steam; a mixing and atomizing nozzle connected to a source of reaction materials and connected to said feed line for supplying steam for atomizing such reaction materials with the aid of the superheated steam and for forming a mixture of the superheated steam with finely dispersed particles of the reaction material; a vertically oriented reaction vessel having a tubular reaction chamber containing an input and heat exchange means surrounding said reaction chamber and supplying heat thereto, with said atomizing nozzle being disposed at the input of said tubular reaction chamber and connected thereto by a flaring end for feeding the resulting mixture into said tubular reaction chamber where the superheated steam and the reaction material substantially react to produce cracked gas; means associated with said vessel for conducting cracked gas and any remaining mixture out of said tubular reaction chamber and through said heat exchange means where the remaining mixture is reacted to complete production of the cracked gas; intake means connected to said heat exchange means for feeding nuclear reactor coolant into said reaction vessel for supplying heat to said vessel, said heat exchange means being arranged for passing the coolant around the tubular reaction chamber; and outlet means connected to said heat exchange means for removing the coolant.

2. Apparatus as defined in claim 1 wherein said feed line for supplying steam is disposed between the wall of said reaction vessel and said heat exchange means for superheating the steam.

3. Apparatus as defined in claim 1 wherein said nozzle is a Venturi nozzle.

4. Apparatus as defined in claim 1 wherein said tubular reaction chamber is disposed along the longitudinal axis through the center of said reaction vessel and said nozzle is disposed at the lower end of said reaction chamber.

5. Apparatus as defined in claim 1 wherein said heat exchange means is arranged for passing the coolant around the tubular reaction chamber in a path countercurrent to the flow path of the mixture through the reaction chamber; said intake means is disposed at the upper end of said reaction vessel; and said outlet means is disposed at the lower end of said vessel.

6. Apparatus as defined in claim 1 wherein said intake means are disposed approximately midway between the upper and lower ends of said vessel; and said outlet means are disposed at the upper and lower ends of said vessel.

7. Apparatus as defined in claim 1 wherein the reaction material consists at least partly of coal dust and further comprising: a spreader atomizer connected for introducing coal dust into said reaction chamber and disposed outside of said reaction chamber adjacent to said nozzle.

8. Apparatus as defined in claim 7 wherein said spreader atomizer is driven by steam.

* * * * *